Sept. 25, 1951     W. SKLAVENITIS     2,569,262
FOOD SUPPORTING CRADLE
Filed July 25, 1949
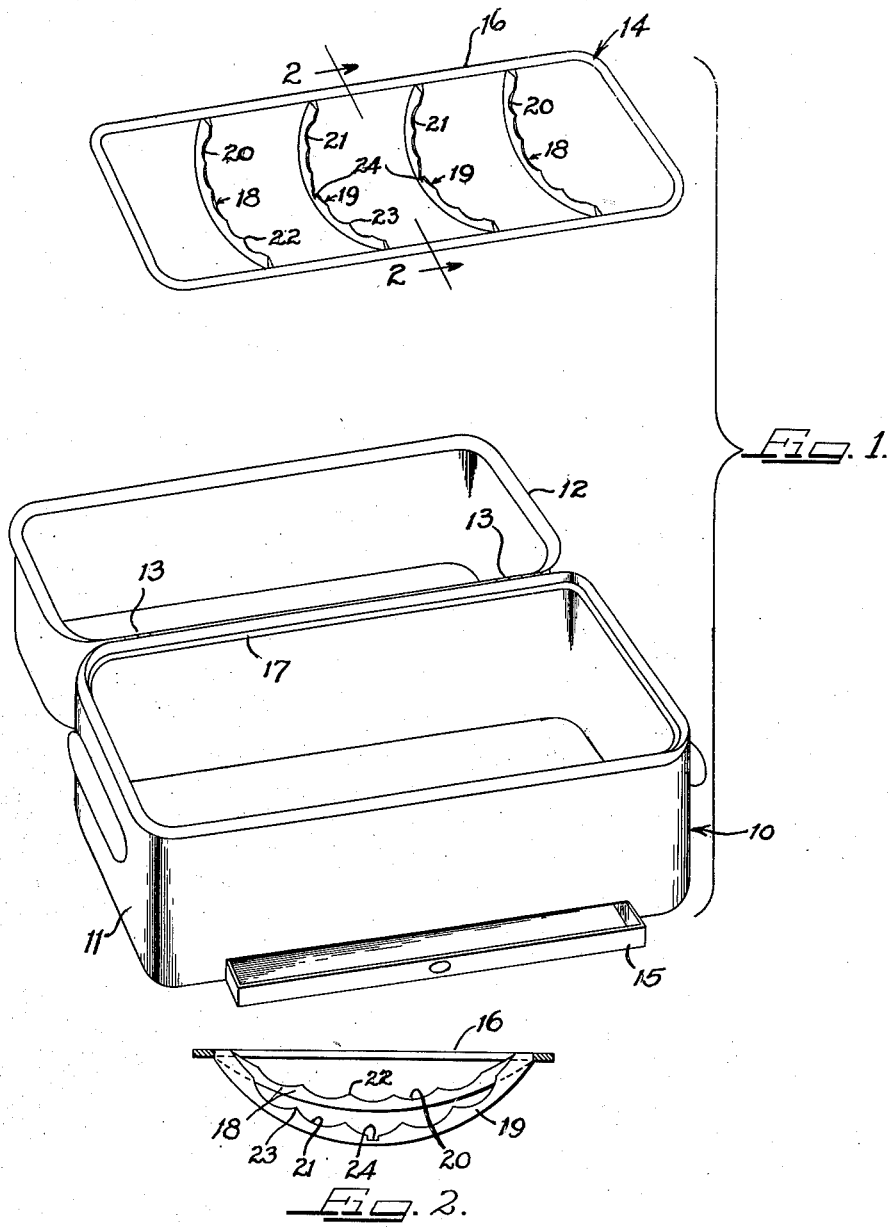
Inventor
WILLIAM SKLAVENITIS.
by Charles H. Redman Atty.

Patented Sept. 25, 1951

2,569,262

UNITED STATES PATENT OFFICE 2,569,262

FOOD SUPPORTING CRADLE

William Sklavenitis, Geneva, Ill.

Application July 25, 1949, Serial No. 106,534

2 Claims. (Cl. 99—426)

This invention relates in general to cooking utensils and more particularly to a device or cradle for holding food during cooking operations.

Generally, the apparently numerous forms of cookery may be reduced to two; i. e., roasting and broiling. In this general sense, roasting includes all of the cooking processes which consist essentially in the exposure of food to the action of heat without the presence of any fluid excepting its own natural juices. For such type of cooking, a roaster is usually used.

In roasting, the first application of heat should be powerful and rapid, so as to form an external wall, by hardening the skin, and coagulating the superficial juices and thus retain the deep seated juices as much as possible within the food being cooked. In order to expose the maximum surface of the food to the initial wall-hardening and subsequent cooking heat, it is desirable that the food be suspended within the roaster. My invention seeks to provide such a suspension for food as it is being roasted.

Generally, the cradle device comprises a frame adapted for attachment to a roaster and from which spaced hangers are suspended in a position within the roaster. The hangers are so shaped as to provide a generally dished cradle on which the food is supported as cooking heat is applied. The maintenance of a minimum surface contact between the hangers and the food effects a maximum exposure of food surface to the heat.

It is, therefore, an important object of this invention to provide a food supporting device so constructed as to effect the maximum exposure of food surfaces to cooking heat.

Another object of this invention is the provision of a food supporting device adapted for use with a roaster for suspending food therein in such a manner as to obtain a maximum surface application of heat to the food.

Another and further object of the invention is the provision of a food supporting device adapted to securely hold differently shaped articles of food.

A still further object of this invention is the provision of a food cooking utensil which is simple in construction, economical to manufacture, and highly efficient in operation.

Other and further objects of the invention will become apparent to those skilled in the art from the following detailed description of the preferred embodiment of the invention as disclosed in the annexed sheet of drawings.

On the drawings:

Figure 1 is an exploded view showing in perspective the food cradle of this invention and a roaster with which the cradle is used; and, Figure 2 is an enlarged vertical cross-sectional view, with parts in elevation, taken along the line 2—2 of Figure 1.

As shown on the drawings:

In Figure 1 there is shown a roaster 10 of a generally conventional construction. The roaster has a body 11 and a top 12 hinged thereto at 13, 13. For purposes that will more clearly appear hereinafter, it is desirable that both the top and body be constructed to direct heat to food supported in the cradle 14. For example, when the roaster is electrically heated, coils are provided in both top and body.

Inasmuch as fats and excessive fluids from the food being roasted drip to the bottom of the roaster, a drip tray 15 is provided for easy removal.

The cradle 14 includes a frame 16 preferably formed of narrow strip metal. The frame is shaped to seat on a ledge 17 formed just below the upper rim or edge of the roaster body. It is to be understood, of course, that the cradle frame may rest on top of the body rim. By providing a recessed ledge, the cradle is securely held in position where the top 12 is moved to a closed position.

A plurality of cradle ribs or hangers 18 and 19 extend across the frame 16 and are anchored thereto. The end hangers 18, 18 are similarly constructed as are the hangers 19, 19. All of the hangers on their top edges have scallop recesses 20 and 21 so arranged in alignment as to provide cradles for food supported thereon. The points 22 and 23, at the junction of adjacent recesses, serve as food spits. In addition to the scallop recesses, the hangers 19, 19 have vertical, straight-walled recesses 24, 24. These latter recesses are shaped to receive slices of bread for toasting.

The hangers, as best shown in Figure 2, are so curved as to form with the ends of the frame a dished cradle. That is, the cradle has its greatest depth between the central hangers 19, 19 and a lesser depth at the hangers 18, 18. This facilitates laying various shaped articles of food in the cradle and removing them therefrom.

It is desirable that the hangers be placed in spaced relation close enough to each other as to receive thereon food articles of various lengths, even to such small items as eggs.

The hangers are so shaped as to afford a minimum of surface in contact with food thereby effecting a maximum of food surface exposed to cooking heat. This, together with the suspension of food between the side walls of the roaster and the radial application of heat directed on the food, effects a more efficient roasting operation.

The invention has been described herein more or less precisely as to details, yet it is to be understood that the invention is not limited thereby, as changes may be made in the arrangement and proportion of parts, and equivalents may be substituted, without departing from the spirit and scope of the invention.

I claim as my invention:

1. A food supporting cradle adapted for use with a roaster having a seating ledge, comprising a frame having spaced side and end members, a plurality of arcuately shaped hangers extending in spaced apart relation across said frame, the arcuate shape of said hangers being such that together with said frame providing a cradle sloping in a downward direction with respect to both the length and width thereof, food receiving recesses in the upper edges of said hangers, certain of said recesses being of scalloped configuration, and prongs formed at the junctures of said scalloped recesses.

2. A food supporting cradle adapted for use with a roaster having a seating ledge, comprising a frame having spaced side and end members, a plurality of arcuately shaped hangers extending in spaced apart relation across said frame between the side members thereof, the arcuate shape of said hangers being such that each is on a different elevation with respect to an adjacent hanger and together with said frame providing a cradle sloping in a downward direction towards the center of the cradle with respect to both the length and width thereof, food receiving recesses in the upper edges of said hangers, certain of said recesses being of scalloped configuration, and prongs formed at the junctures of said scalloped recesses.

WILLIAM SKLAVENITIS.

REFERENCES CITED

The following references are of record in the file of this patent:

UNITED STATES PATENTS

| Number | Name | Date |
|---|---|---|
| 354,562 | Matthews | Dec. 21, 1886 |
| 691,833 | Williamson | Jan. 28, 1902 |
| 728,067 | Young | May 12, 1903 |
| 1,066,552 | Taylor | July 8, 1913 |
| 1,389,770 | May | Sept. 6, 1921 |
| 1,666,394 | Miglin | Apr. 17, 1928 |
| 1,698,914 | Kircher | Jan. 15, 1929 |
| 2,205,064 | Irwin | June 18, 1940 |
| 2,297,332 | Stewart | Sept. 29, 1942 |
| 2,421,922 | Bocchino | June 10, 1947 |
| 2,450,716 | Chittick | Oct. 5, 1948 |
| 2,504,237 | Weissbach | Apr. 18, 1950 |

FOREIGN PATENTS

| Number | Country | Date |
|---|---|---|
| 376,053 | France | July 30, 1907 |
| 243 | Great Britain | Jan. 3, 1912 |
| 453,795 | France | June 16, 1913 |
| 356,400 | Germany | July 20, 1922 |